Patented June 19, 1934

1,963,105

UNITED STATES PATENT OFFICE 1,963,105

METHOD FOR THE PRODUCTION OF CUPROUS OXIDE

Thomas B. Swift, Martinez, Calif., assignor to The Mountain Copper Company, Limited, a corporation of Great Britain No Drawing. Application June 6, 1933, Serial No. 674,597

6 Claims. (Cl. 23—147)

This invention has for its object the direct conversion of metallic copper into cuprous oxide ($Cu_2O$).

Known processes for the manufacture of cuprous oxide generally involve one of the following operations:

1. Heating metallic copper to a high temperature, with limited access of air.
2. Heating mixtures of metallic copper and cupric oxide ($CuO$) to a high temperature.
3. Reducing cupric solutions and precipitating cuprous oxide therefrom.
4. Electrolysis of alkaline solutions, using copper electrodes.

Many combinations and variations of the foregoing methods are mentioned in the literature, but very few of them are of commercial importance.

It has been known for a long time that the commercial product known as copper cement, when finely ground, is valuable as a pigment in the manufacture of so-called marine paints.

Also it has been known that the toxic properties of the marine paints, thus made, are directly proportional to the cuprous oxide content.

Cement copper, as ordinarily produced, has little toxic value in marine paint due to its low cuprous oxide content. By specialized methods of moistening, heating, aerating and drying, I have hitherto made a product containing up to 75% of cuprous oxide. This method, however, is difficult to control. The reactions are carried out in heaps of the properly prepared material, and if carried too far, in the attempt to produce a higher percentage of cuprous oxide, the result is almost invariably an oxidation of the cuprous oxide to cupric oxide, which latter substance is practically valueless in marine paints.

In an effort to overcome this difficulty, and after much experimentation, I have discovered that metallic copper, either in agitated suspension in water or charged in such a manner as to permit the free circulation of water and gas between and among the surfaces of the copper pieces or particles, can be oxidized to cuprous oxide by heating and agitating, while introducing compressed air or other suitable oxygen containing gas. The operation may be carried out in suitable apparatus, such as the conventional Pachuca tank in which the air necessary for the reaction also produces the necessary agitation.

The process is aided by the use of a small percentage of sodium chloride, but other haloid salts of the alkali or alkaline earth metals act in the same manner; for example, sea water has been found to give the desired catalytic action in this process.

Apparently the catalytic action is due to the stabilizing of cuprous ions in solution. I therefore define a suitable catalyst as one that stabilizes cuprous ions in solution and increases the rate at which cuprous oxide is formed.

In converting a charge of copper cement into cuprous oxide, I have used copper cement analyzing approximately:

| | Per cent |
|---|---|
| Copper | 93.0 |
| Iron | 2.0 |
| Arsenic trioxide | 0.6 |
| Sulfuric anhydride | 0.4 |
| Lime and magnesia | 0.1 | charging same into a vertical tank with a conical bottom corresponding to the standard conventional Pachuca tank containing hot water and about one pound of sodium chloride to the 100 gallons of water. Air is blown into the tank, at the bottom, at a sufficient rate to completely suspend the copper particles in the water and incidentally supply the necessary oxygen. Live steam is introduced into the charge at such a rate as will maintain a degree of temperature in the neighborhood of 100° C. I have successfully used temperatures of 70° C. to 85° C., and also temperatures as low as 50° C. to 70° C., but with a slower resultant reaction.

The oxidation to cuprous oxide proceeds uniformly to completion. Careful control is necessary to prevent over-oxidation and conversion into cupric oxide. It usually takes about 48 hours to complete the reaction, but this time varies.

From the foregoing specified copper cement I have by this procedure made a product analyzing approximately:

| | Per cent |
|---|---|
| Cuprous oxide | 91.7 |
| Cupric oxide | 1.9 |
| Metallic copper | 1. |
| Arsenic trioxide | .6 |
| Ferric hydroxide | 2.72 |
| Sulfuric anhydride | .45 |
| Lime and magnesia | .1 |

This product is eminently satisfactory in the manufacture of most marine paints; a purer product would, of course, result from the use of an initially purified copper cement, but the process is not limited to the oxidation of copper cement to cuprous oxide as any other form of metallic copper may be used.

I claim:

1. A process for the conversion of metallic copper into cuprous oxide which comprises contacting the metallic copper with water and an oxygen containing gas under continuous agitation at elevated temperatures.

2. A process according to claim 1 in which metallic copper is contacted with water, live steam and air.

3. A process according to claim 1 in which metallic copper is contacted with water and air at temperatures above 50° C. up to the boiling point of the solution used.

4. A process according to claim 1 in which metallic copper is contacted with water, steam and air and a suitable cuprous ion stabilizing water soluble catalyst.

5. Process according to claim 1 in which the temperature of the mixture is maintained at about 100° C.

6. Process according to claim 1 in which the metallic copper is contacted with water in the presence of sodium chloride at a temperature of at least about 85° C.

THOMAS B. SWIFT.